United States Patent [19]

Feig et al.

[11] Patent Number: 6,002,809
[45] Date of Patent: Dec. 14, 1999

[54] DIGITAL IMAGE PROCESSOR FOR IMAGE SCALING

[75] Inventors: Ephraim Feig, Ossining, N.Y.; Ian Richard Finlay, Scarborough, Canada; Elliot Neil Linzer, Bronx, N.Y.

[73] Assignee: International Business Machines Corporation, Armonk, N.Y.

[21] Appl. No.: 08/264,833

[22] Filed: Jun. 23, 1994

Related U.S. Application Data

[63] Continuation of application No. 08/047,734, Apr. 15, 1993, abandoned.

[51] Int. Cl.$^6$ ........................................... G06T 3/40
[52] U.S. Cl. ........................... 382/298; 382/250; 382/166
[58] Field of Search ................................. 382/44, 47, 56, 382/298, 293, 248, 250, 232, 166; 358/133, 135, 136, 433, 451

[56] References Cited

U.S. PATENT DOCUMENTS

| | | | |
|---|---|---|---|
| 4,673,977 | 6/1987 | Stelzenmuller | 358/133 |
| 4,791,598 | 12/1988 | Liou et al. | 364/725 |
| 4,833,535 | 5/1989 | Ozeki et al. | 358/135 |
| 4,941,043 | 7/1990 | Jass | 358/133 |
| 4,985,767 | 1/1991 | Haghiri et al. | 358/133 |
| 5,001,559 | 3/1991 | Gonzales et al. | 358/133 |
| 5,008,746 | 4/1991 | Bernard et al. | 358/133 |
| 5,010,402 | 4/1991 | Nishino | 358/138 |
| 5,021,891 | 6/1991 | Lee | 358/432 |
| 5,103,306 | 4/1992 | Weiman et al. | 358/133 |
| 5,117,381 | 5/1992 | Juri et al. | 364/725 |
| 5,121,216 | 6/1992 | Chen et al. | 358/433 |
| 5,128,756 | 7/1992 | Johnston et al. | 358/133 |
| 5,196,946 | 3/1993 | Balkanski et al. | 382/56 |

OTHER PUBLICATIONS

Feig et al. "New Scaled DCT Algorithms for Fused Multiply/Add Architectures" IEEE 1991 pp. 2201–2204.
Feig et al. "Fast Algorithms for the DCT" IEEE IPP2 vol. 4. No. 9. pp. 2174–2191.

E. Feig, "Method and Apparatus for Implementing Scaled or Non–Scaled DCTS", IBM Tech. Discl. Bull., vol. 34, No. 12, May, 1992, pp. 376–377.

"Quantization Matrix Conversion for Scaled DCT Computations", IBM Tech. Discl. Bull. Vo. 33, No. 10B, Mar. 1991, pp. 341–342.

E. Feig et al., "Discrete Cosine Transform Algorithms for Image Data Compression", Research Report, RC 16149 (#71775) Oct. 2, 1990.

E. Feig et al. "Fast Algorithms for the Discrete Cosine Transform", Research Report, RC 16148 (#71774) Oct. 2, 1990.

*Primary Examiner*—Amelia Au
*Assistant Examiner*—Larry J. Prikockis
*Attorney, Agent, or Firm*—Daniel P. Morris

[57] ABSTRACT

The objects of this invention are accomplished by combinging the inverse DCT of an appropriate size with scaling on the resulting reconstructed image. In particular, if the data is stored as DCT values of blocks of size P×Q and an output image is to be scaled by a factor of R in one dimension and S in the second dimension, then the process is performed in two stages. First a scaling of factor K1/P in the first dimension and a scaling of factor L1/Q in the second dimension are done by inverse transforming with 2-dimensional DCTs of size K1×L1. A factor $\sqrt{(K1/P)} \times \sqrt{(L1/Q)}$ is absorbed into a dequantization process prior to the inverse transorm process. Then a scaling of factor K2/K3 in the first dimension and a scaling of factor L2/L3 in the second dimension is done in the spatial domain. The integers K1, K2, K3, L1, L2, L3 are chosen so the (K1K2/K3)=R, (L1L2/L3)=S, (K1/P)≧R, (L1/Q)≧S, and the ratios (K2/K3) and (L1/L2) are close to 1. The inequality constraints guarantees that the inverse DCT process does not remove low-frequency components that should be present in in image scaled down by factors R, S. The conditions that the ratios K2/K3 and L2/L3 be close to 1 are imposed so that the scaling procedure be simple (fast) to implement. Typically, but not necessarily, P=Q, R=S, K1=L1, K2=L2, K3=L3.

30 Claims, 3 Drawing Sheets

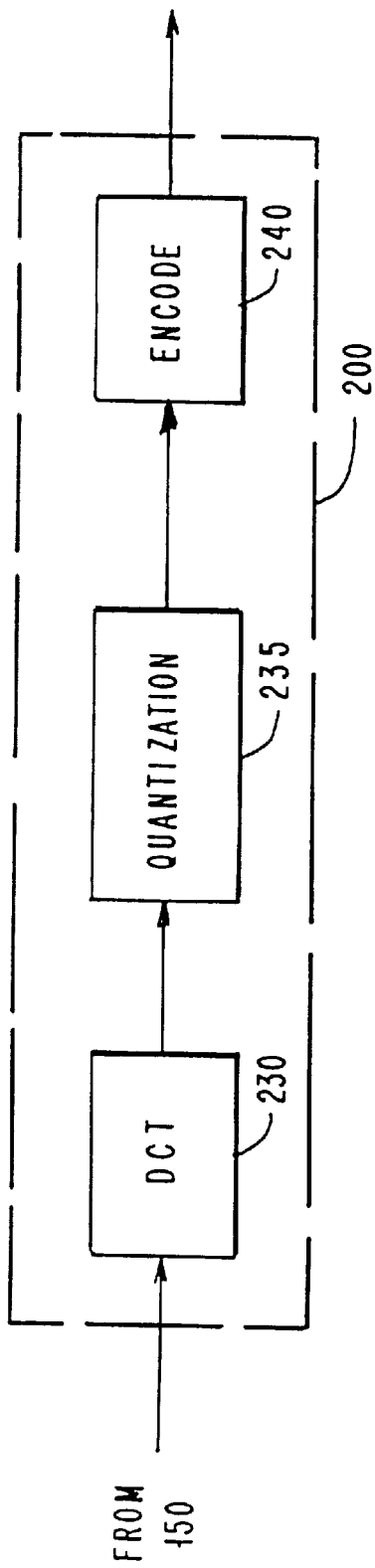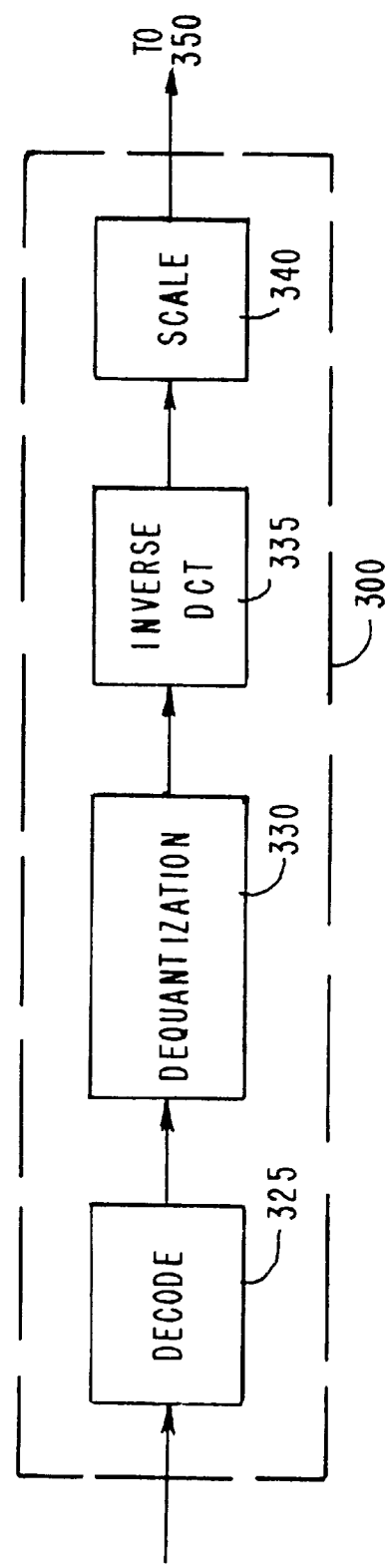

DIGITAL IMAGE PROCESSOR FOR IMAGE SCALING

This is a continuation of application Ser. No. 08/047,734, filed Apr. 15, 1993, now abandoned.

FIELD OF THE INVENTION

This invention relates generally to the field of image processing. In particular, this invention relates to methods and apparatus for digitally representing images and scaling digital representations of images. More specifically, this invention relates to a method and apparatus for scaling images which are stored in compressed, quantized Discrete Cosine Transform format.

BACKGROUND OF THE INVENTION

The display, transmission and storage of visual images is increasingly important for modern communications. In particular, it is important for modern computer driven displays to receive, transmit, store and display sequences of images in rapid succession such as is shown in movies. The quality of the visual display can be improved by representing the visual images in a digital format. Generally, a visual image can be represented by dividing the image into sufficiently small picture elements, called pixels, and assigning to each pixel a color and a value representing the intensity of the color for the pixel. For example, a typical 8 inch by 10 inch visual image may be divided into a two dimensional array of 768 by 1024 pixels wherein each pixel is further divided into 3 subpixels. The three subpixels are each associated with one of the three primary colors red, green, or blue. Each subpixel is assigned a digital value corresponding to the intensity level for the color of the subpixel. The subpixels are small enough such that the human eye does not resolve each subpixel. Rather, the image presented by a pixel to the viewer is some combination of the three colors associated with each subpixel weighted by the intensity value for each subpixel color. As a result, the visual image is represented by three two dimensional matrices of color intensity values.

This digital image represents a high quality image because the pixels are small. However, as the pixel gets smaller, there are more pixels for the same size image and more intensity values to store, manipulate, and transmit. The fact that more pixels requires more data also results in a reduction in the ability to transmit images because the amount of data for each image transmitted is so large. As a result, various efforts have been made to transform the Red Green Blue (RGB) data into another form of data which can be transmitted and stored efficiently and which can also be re-transformed back into RGB data for display. The new form of data most often chosen relates the RGB data to a luminance value and two chrominance values. In particular, the luminance value represents the intensity of a pixel on a grey scale which provides an accurate representation of the image to a monochrome display. The luminance value is obtained by weighting each intensity value of the RGB data and combining them. For example, the National Television Systems Committee (NTSC) standard luminance value Y=0.299R+0.587G+0.114B, wherein R is the red intensity value, G is the green intensity value, and B is the blue intensity value. The two chrominanace values convey information which describes how the colors differ from monochrome. For example, the NTSC values are U=Y−B and V=Y−R. The RGB to YUV transform compacts most of the visual intensity information into the luminance variable. This effect is similar to viewing a color image on a monochrome monitor in that the viewer understands a significant portion of the image but does not understand it all. This effect is useful for reducing the amount of data representing the image because the YUV data can be digitally filtered and coded such that much of the chrominance data, and some of the luminance data, can be discarded and replaced with code values. There are a variety of techniques for performing the filtering process, the most common of which is a Discrete Cosine Transform (DCT). The DCT replaces local blocks of YUV pixel data (typically 8×8 pixels) with data generated from the YUV to DCT conversion performed on the YUV data. The resulting DCT data may then be quantized and coded, yielding a very compact representation which can be easily stored or transmitted.

The storage and transmission of coded and quantized DCT data is efficient because there is much less data volume than would be the case for storing or transmitting the full YUV or RGB image data. The visual image represented by the DCT data can be reconstructed at the point of visual display (or use) by inverting the coding, YUV, and DCT processes and applying these inverted processes to the DCT data to yield RGB image data. These coding, YUV, and DCT processes are largely, but not exactly invertable. More specifically, the quantization process is not completely invertable because it contains a data truncation step and the part of the data which is lost by the truncation is not recoverable. Nevertheless, the inversion processes re-convert the DCT data into a visual image which is visually indistinguishable from the original image. The problem with these inversion processes, however, is that many applications of digital image processing require the reconstructed image to be of a size which is not identical to the original image. That is, the reconstruction must be scaled, either up or down, with respect to the original image. This is a problem with the process of merely inverting the DCT processes because this process generates a 1:1 scaled image of the original image which then must be separately scaled to the desired size. The scaling process on top of the inverted DCT processes require many mathematical operations. More particularly, they require many non-trivial multiplications which require a substantial amount of computer processor time to complete. This processor time must be spent on each pixel of each image processed, and so much computer processor time is used when scaling the image that the rate at which the images may be displayed is degraded. Degrading the display rate degrades the ability to display objects in motion. As a result, either the speed at which the processor multiplies must be increased or the scaling process must be changed to require fewer arithmetic operations in order to implement high quality motion displays.

One prior art attempt at increasing the speed of the multiplications is to replace the multiplication operations with look up tables. Look up tables may reduce the time required for multiplication operations which often are much slower than additions or subtractions because multiplications in the binary number system are typically a series of bit shift and add operations so that the time for each multiplication is a multiple of an add operation. Also, look-up tables are convenient to implement whereas special purpose multiplication hardware is much more complex than special purpose fixed point addition, subtraction and shift hardware. However, even though a look up table decreases the number of multiplication operations, they can still be rather slow. Moreover, many computer processors are very efficient in using time between multiplications when performing many multiplications because of the pipelined structure of the processor. When look up tables are used in conjunction with computer processors, the pipelined structure can be disrupted and the overall efficiency of image processing is decreased even though the individual look up table operation is faster than the multiplication operation. Therefore, look up tables have not been very successful in increasing the speed of the image processing.

Beyond inproving the speed of the multiplication operation, the prior art has also attempted to reduce the number of arithmetic operations required for scaling. Scaling involves filtering. Filtering involves multiplications and additions and/or subtractions. Reducing the number of arithmetic operations in the filtering process often has the effect of degrading the visual quality of the scaled image. The prior art has also attempted to adjust the scaling process by direct scaling with modified inverse DCT processes. For example, an image coded with P×P blocks subjected to P×P DCTs is decoded with inverse DCTs of size Q×Q. If Q≦P, then the leading (top left) Q×Q majors of the P×P DCT components are subjected to the inverse Q×Q DCT. If Q≧P, then the P×P block of DCT components is padded with 0's on the right and bottom, and the resulting larger block is subjected to a Q×Q inverse DCT. In either case, the result is an image scaled by factor Q/P in each dimension. The problem with this scaling technique is that it is only valid for a very constrained set of possible scaling ratios. For example, an image processed with 8×8 DCTs cannot be scaled to a factor 1/3 or a factor 2/3 using this method.

OBJECTS OF THE INVENTION

It is an object of the present invention to manufacture an improved digital image processor.

It is a further object of the present invention to manufacture a faster digital image processor.

It is still another object of the present invention to manufacture a digital image processor having a scaling function useful over a wide range of scaling ratios for scaling image data stored in DCT format.

It is still a further object of the present invention to manufacture a digital image processor having an improved scaling function of image data stored in DCT format.

It is still another object of the present invention to manufacture a digital image processor having an improved scaling function of image data stored in DCT format which reduces the time required for arithmetic processes.

It is still a further object of the present invention to manufacture a digital image processor having an improved scaling function of image data stored in DCT format which reduces the number of arithmetic operations performed in the decoding and scaling function.

SUMMARY OF THE INVENTION

The objects of this invention are accomplished by combining the inverse DCT of an appropriate size with scaling on the resulting reconstructed image. In particular, if the data is stored as DCT values of blocks of size P×Q and an output image is to be scaled by a factor of R/P-to-1 in one dimension and S/Q-to-1 in the second dimension, then the process is performed in two stages. First a scaling of factor K1/P in the first dimension and a scaling of factor L1/Q in the second dimension are done by inverse transforming with 2-dimensional DCTs of size K1×L1. A factor $\sqrt{(K1/P)} \times \sqrt{(L1/Q)}$ is absorbed into a dequantization process prior to the inverse transform process. Then a scaling of factor K2/K3 in the first dimension and a scaling of factor L2/L3 in the second dimension is done in the spatial domain. The integers K1, K2, K3, L1, L2, L3 are chosen so that (K1K2/K3)=R, (L1L2/L3)=S, (K1/P)≧R, (L1/Q)≧S, and the ratios (K2/K3) and (L1/L2) are close to 1. The inequality constraints guarantee that the inverse DCT process does not remove low-frequency components that should be present in in image scaled down by factors R, S. The conditions that the ratios K2K3 and L2/L3 be close to 1 are imposed so that the scaling procedure be simple (fast) to implement. Typically, but not necessarily, P=Q, R=S, K1=L1, K2=L2, K3=L3.

BRIEF DESCRIPTION OF THE DRAWINGS

FIG. 2 illustrates one embodiment of a first data conversion means according to the present invention.

FIG. 3 illustrates one embodiment of a second data conversion means according to the present invention.

DESCRIPTION OF THE PREFERRED EMBODIMENT

Figure 1:
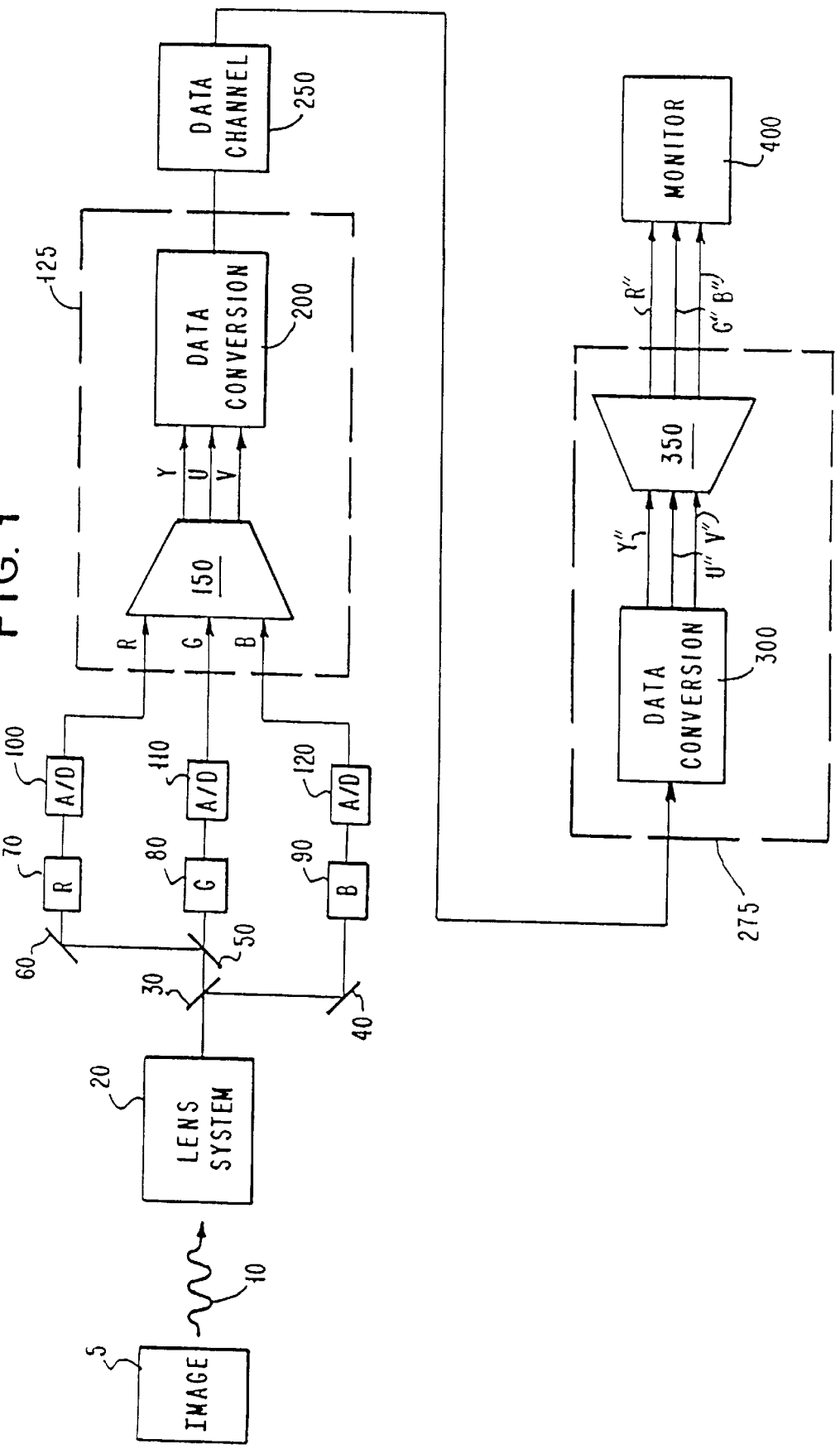
FIG. 1 illustrates one embodiment of a digital image processor system according to the present invention.

FIG. 1 illustrates one embodiment of an apparatus for the formation, transmission, and presentation of a digital image according to the present invention. Source light 10 from an image subject 5 is transmitted by a lens system 20 to a light beam mirror system. The lens system 20 generally consists of an objective lens and a condenser lens for forming the real image and a relay lens for transmitting the real image to the mirror system. The mirror system consists of a blue reflecting dichroic mirror 30 which transmits blue light to sensor means 90 by mirror 40. Similarly, the mirror system uses a red reflecting dichroic mirror 50 to transmit red light to sensor means 70 by mirror 60. The remaining green light is passed directly through the mirror system to sensor 80. Each of the sensor means is a two dimensional array of light sensitive elements in which each element senses an intensity level of the light and converts that intensity level into an analog electrical signal. Each element in the red sensor array has a corresponding elemtn in the green and blue sensor arrays so that the addition of red, green, and blue colors having the intensity level for a particular element results in the composite light signal produced by lens system 20 for that particular element. The output of each element in the two dimensional array of sensor elements is sent to an analog to digital (A/D) converter. The analog signals produced by red sensor means 70 is sent to A/D converter 100, the output of green sensor means 80 is sent to A/D converter 110, and the output of blue sensor means 90 is sent to A/D converter 120. The A/D converters convert the analog signals into a two dimensional matrix of digital values representing the intensity of light for each element in the red, green, and blue sensors. The accuracy of the A/D converters in this embodiment is 8 bits but this accuracy could be a variety of values such as 4, 6, or 10 bits. The A/D converters create data for one two dimensional matrix having one value of a given accuracy for each element in the matrix for each of the three colors red, green, and blue. The creation of the matrices of digital values representing the color sensor outputs, called RGB data, can be created in a variety of conventional methods other than described above. For example, scanning means or artificial creation of the color data generated by conventional computers are typical methods of generating the RGB data. All of these methods have in common the fact that the RGB data is a representation of a physical measurement of light intensity for each element of the two dimensional array of color sensor elements.

Once the RGB data has been created, the data is transformed and coded. In particular, the RGB data is transformed into YUV data in which the Y value represents the luminanace value of the composite RGB data for a single element in the two dimensional array in the corresponding red, green, and blue sensors. Also, the U and V values represent the (Y—blue) and (Y—red) values, respectively, of the composite RGB data for a single element in this two dimensional array. The three two dimensional matrices containing digital RGB data are converted into three two dimensional matrices in which one matrix has Y data, one matrix has U data, and one matrix has V data. The RGB data is transformed into YUV data by transform means 150 because YUV data can be coded for transmission more efficiently than RGB data. Moreover, in alternate embodiments of the present invention, the UV components may also be subsampled or filtered and subsampled to yield a smaller data set. Typically, either no subsampling occurs, or subsampling of 2-to-1 in either one or two dimension occurs, or perhaps even subsampling of 4-to-1 in one or two dimensions occurs, or any combination of these occurs, with or without pre-filtering. The resulting YUV data is sent to data conversion means 200 which selectively filters the data, quantizes the filtered data, and encodes the quantized filtered data for transmission. The selective filtration of the YUV data is accomplished through a filter means such as a discrete cosine transform (DCT). The DCT selectively reduces the amount of YUV data required to recreate an image. The RGB to YUV transform compacted a substantial amount of visual information into the luminance variable for each element of the two dimensional array so that much of the U and V data is not required to recreate the visual image. The DCT filter systematically removes and combines YUV data which is not required to accurately reproduce the image. DCT filtering is a block-method, wherein contiguous blocks of M×N pixels are transformed independently via the DCT transform. In general, but not necessarily, M=N.

After the YUV data has been filtered through the DCT, it is then quantized. The quantization normalizes the DCT data and then truncates the normalized DCT data by rounding the normalized DCT data off to the nearest binary integer. This step is required because it is more efficient to transmit a large volume of data having a normalized distribution rather than a large volume of random data. The quantization process contains a multiplication step in which each vector of DCT data is multiplied by a constant which normalizes the DCT data. After the SDCT data has been generated, FIG. 2 illustrates that the SDCT data is quantized through the quantization step 235. The quantization process is a two step procedure in which the SDCT data is scaled then rounded to the nearest integer. The scaling process is a multiplication step in which each of the N×N SDCT data values for each of the three Y, U, and V matrices is multiplied by a constant which is usually predetermined experimentally once and for all and accounts for the characteristics of the human visual system. In the standard DCT compression scheme, each of the N×N blocks in each of the Y, U, V matrices which is transformed via the DCT, after transformation, is multiplied pointwise by the reciprocal of a predetermined quantity $\eta_{ij}$, $0 \leq i$, $j \leq N-1$. The N×N matrix $(\eta_{ij})$ is often called the quantization matrix. This matrix may vary for each of the various color planes Y, U and V. The generation of such quantization matrices is a known art. If the block output of the DCT is $\hat{x}_{ij}$, then the block output after quantization is $b_{ij}=\hat{x}_{ij}/\eta_{ij}$. The present invention utilizes a modified DCT process in which non-trivial multiplications arising from the standard DCT process are factored into a a diagonal matrix $D_{N \otimes N}$ which is in turn multiplied by the quantization matrix. That is, non-trivial multiplications in the standard DCT are removed and combined with other non-trivial multiplications from the quantization process so that non-trivial multiplications only have to be carried out once in the transformation of the YUV to DCT form data.

Finally, once the modified DCT output data has been quantized, the normalized data is encoded for digital transmission by a conventional process, such as a Huffman coding process, and then the coded data is converted into electrical or optical signals which are transmitted over a data channel 250. The Huffman (or similar) coding procedure compresses the quantized DCT data into a serial bit stream which can be conveniently transmitted. Conventional electrical conversion devices convert the serial bit stream into electrical signals which are then applied to electrical transmission wires for carrying the electrical signals. The code to signal conversion devices could also be optical or electromagnetic devices which transform the serial bit stream into optical or electromagnetic signals which would then be applied to the optical media (such as fiber optic cables) or electromagnetic media (such as the atmosphere).

Data channel 250 comprises a transmitter, receiver, and interconnection media. The interconnection media can be electrical or optical, or can be merely atmospheric in the case of satellite transmission. Conventional data transmitters transmit data through the interconnection media to a conventional data receiver which sends the data to processor 275. Processor 275 contains a data conversion unit 300 and a Y"U"V" to R"G"B" transformer 350. The DCT filter, normalization, and encoding processes associated with the data conversion means 200 are reversible through the data conversion means 300. The data conversion means 300 decodes the encoded data, dequantizes it, performs an inverse quantized DCT (IQDCT) on the decoded data, and then scales it. The dequantization process is only a multiplication step (as opposed to a multiplication and truncation step) in which the decoded DCT data is multiplied by a quantity $\eta_{ji}$ which is the inverse of the normalization constant. The dequantization process also absorbs the non-trivial multiplications of the IQDCT and scaling processes, as explained below, so that non-trivial multiplications will be carried out only once in the transformation of decoded data to Y"U"V" data. The conversion means 300 generates Y"U"V" data which is similar to a scaled version of the YUV data which started the process. When the scale factor is 1 so that the output data Y'U'V' of the IQDCT is the same as the Y"U"V" data, the generated Y'U'V' may still not be identical to the original YUV. This is because the Huffman coding, normalization, and the DCT of data conversion means 200 can be inverted, however as described above, the quantization process cannot be completely reversed because truncated data is not recovered. Therefore, when the IQDCT is performed on the de-coded and dequantized Huffman code, the resulting Y'U'V' data is not the same as the YUV data which started the process. Once the Y"U"V" data has been generated, it is then sent to transform means 350. Transform means 350 converts the Y"U"V" data into R"G"B" data which is then sent to a monitor. If the original UV components were either subsampled or filtered and subsampled, then the conversion starts by first appropriately upsampling the U"V" components. The monitor 400 reproduces scaled images from the R"G"B" data. The reproduced images are perceived as essentially a scaled version of the original images which generated the RGB data.

The tranform means 150 and data conversion means 200 form processor 125. The data conversion means 300 and inverse transform means 350 form inverse processor 275. A common element to both the processor and inverse processor is the RGB to YUV transform and inverse transform operation. Specifically, the transform means converts RGB data to YUV data according to the following function: $Y=0.229R+0.587G+0.114B$ and $U=Y-B$ and $V=Y-R$.

Once all the RGB data has been converted to YUV data, the YUV data for each pixel is sent to data conversion means 200. FIG. 2 illustrates that the data conversion means 200 filters, quantizes, and codes the data for transmission. The filter process 230 is a Discrete Cosine Transform (DCT) process in which pixel groups of YUV data are transformed into DCT data through the DCT transform. The DCT transform function weights the Y, U, and V data such that only the data to which the human eye is sensitive is retained. In particular, each of the Y, U, and V matrices of pixel values are divided up into groups of pixels having k×k elements such as 6×6, 8×8, 12×12, etc. The data within each group of pixels for each matrix is replaced by DCT transform data. For example, if X (having elements x(i,j)) represents the data within each of the 64 pixels (for 8×8 pixel grouping) in each of the Y, U, and V matrices, then the resulting DCT data $\Gamma_y = AX_y A^t$ wherein the DCT transform matrix A has elements $a(i,j) = c_i \cos[\pi i(2j+1)/2N]$ for $i,j=0,1,2,\ldots k-1$ and where $c_0 = 1/\sqrt{N}$ and $c_i = \sqrt{2}/\sqrt{N}$ when $i>0$. Similarly, $\Gamma_u = AX_u A^t$ and $\Gamma_v = AX_v A^t$. The DCT transform is repeated for each group of 64 pixels in each 8×8 matrix of Y, U, and V data (or each group of 36 pixels in each 6×6 matrix of Y, U, and V data, or each group of 144 pixels in each 12×12 matrix of Y, U, and V data, etc.). The DCT transform can be implemented in a variety of embodiments. One embodiment of the DCT transform means is a combination of a multiplier and memory which implements a two stage multiplication process. Specifically, the first stage multiplies the columns of X by A and stores the results in a temporary memory. That is, the transform matrix A is applied to a series of 1-dimensional vectors having k elements. The results of this operation are stored to create the product matrix AX. The rows of this resulting matrix are 1-dimensional vectors of data, each of which are multiplied by $A^t$ to create the final product $\Gamma$. This specific procedure is called the row-column method for implementing the DCT. This procedure can also be carried out with look-up tables, special purpose multipliers, ALUs, or other devices suitable for manipulating digital data.

After the DCT data has been generated, FIG. 2 illustrates that the DCT data is quantized through the quantization step 235, as explained above. Also, once the DCT data has been quantized, FIG. 2 illustrates that the data is coded by a data coding process 240 such as Huffman coding. Huffman coding is implemented in a look-up table which substitutes variable length code words for fixed length words of input data. Coding means 240 can also comprise a variety of digital implementations of coding processes, such as ALUs, dedicated multipliers or shift and add units, or other special purpose devices for manipulating digital data. After the data is coded, it is converted into digital signals, and then tranmitted over the data channel 250 by data drivers. The data channel medium may be electrical, optical, or electromagnetic, and as a result, conversion devices which translate individual data bits into signal pulses (and vice versa) may be electrical, electro-optic, or electromagnetic devices. Similarly, data drivers (or transmitters) and data sensors (or receivers) may be electrical, optical, or electromagnetic devices. FIG. 3 illustrates that after transmission, the processor 275 receives the transmitted data and the data conversion means 300 decodes 325, dequantizes 330, applies an inverse quantized-DCT (IQDCT) 335 process to the transmitted data, and scales 340 the output of the IQDCT. The transmitted data is initially decoded 325 through the complement or inverse of the coding procedure such as an inverse Huffman coding procedure. Once the data is decoded, it must be dequantized 330 and have the IQDCT operation 335 performed on it in order to generate Y'U'V' form data. Once the Y'U'V' form data is generated, it is scaled into Y"U"V" data and then the inverse RGB conversion can take place to generate RGB form data for display on a monitor.

The output of the decoding process 325 is three matrices of quantized, DCT data. The dequantization process 330 includes multiplications which reverse the normalization process and non-trivial multiplications associated with the IQDCT 335 and the scaling process 340. Multiplications associated with the IQDCT may be combined into the dequantization step because they can be factored out of the IQDCT as a diagonal matrix. This factorization can be demonstrated by examining in the one dimensional, row column implementation of a forward DCT on k points where $\Gamma = A_k X A_k^t$ matrix on k points, $A_k$, is initially factored as:

$$E_k \tilde{S}_k = A_k, \tag{1}$$

where $E_k$ is a diagonal matrix $$E_k = \sqrt{1/k} \, Diag\left(1, \sqrt{2}, \ldots, \sqrt{2}\right) \tag{2}$$

whose entries are the constants $c_i$ of the DCT transform, and $\tilde{S}_k$ is the remaining factor. The number of points, k, is generally 8, so that $A_k$ is typically 8×8, but k can also be 1, 2, 3, 4, 6, 12, or another number.

The transform matrix $\tilde{S}_k$ is further factored so that not only the constants of the DCT $c_i$ are factored out but factors which cause non-trivial multiplications are also removed. In particular, equation (1) is re-written as:

$$D_k S_k = A_k, \tag{3}$$

where $$E_k^{-1} D_k S_k = \tilde{S}_k, \tag{4}$$

and where $D_k$ is a secondary factor which is a k×k diagonal matrix that factors out as many non-trivial multiplications (other than the constants $c_i$ which are factored out by $E_k$) as possible using a k×k diagonal matrix.

The determination of $D_k$ and $S_k$ is derived from various matrix identities. For the case $k=2^n$ is an integer power of 2, $D_k$ may be taken to be the diagonal matrix whose diagonal entries are the first entries of the rows of $A_k$, and the matrix $S_k$ is then determined. For the case k=pq, a product of two relatively prime integers (integers q and q are relatively prime if their only common factor is 1), the identity is $\tilde{S}_{pq} = R(\tilde{S}_p \otimes \tilde{S}_q)P$ where "$\otimes$" denotes the tensor product operation, P is a permutation matrix, and R is a matrix whose product with an arbitrary vector having pq points requires a computation using only pq−p−q+1 additions and/or subtractions. The matrix R is a k×k matrix whose elements are determined depending on the value of data vector indicies $\mu=0$ to p−1 and v=0 to q−1. The matrix R is an addition matrix; that is, its product by an arbitrary vector involves only additions and subtractions. Because p and q are relatively prime, for every integer τ there exist uniquely integers μ and ν such that $$\tau = \mu q + \bar{\nu} p.$$

Thus every integer τ between 0 and k=pq can be associated with a unique pair of integers μ and ν where $$\mu = \tilde{\mu} \bmod p \quad 0 \le \mu \le p-1$$
$$\nu = \tilde{\nu} \bmod q \quad 0 \le \nu \le q-1$$

An arbitrary k-dimensional vector v(τ) can be thus permuted to its so-called doubly-lexicographic ordered w(μ, ν) where the ordering is (0,0), (1,0), (2,0), . . . , (p−1,0), (0,1), (1,1), (2,1), . . . , (p−1,1), (2,0), (2,1), (2,2), . . . , (2,q−1), . . . , (0,q−1), (1,q−1), (2,q−1), . . . , (p−1,q−1). The matrix R is the matrix which multiplies an arbitrary doubly-lexicographically ordered vector w and produces an output vector (Rw) wherein:

$$(Rw)(\tau) = w(\mu, \nu) \quad (5)$$

when μ ν=0; otherwise (when both μ and ν are not 0), the outputs are determined as follows: write $$\tau_1 = |\mu q - \nu p|,$$

$$\bar{\tau}_2 = \mu q + \nu p,$$

$$\tau_2 = \begin{cases} \bar{\tau}_2 & \text{if } \bar{\tau}_2 < k \\ \bar{\tau}_2 - 2k & \text{if } \bar{\tau}_2 > k; \end{cases}$$

if $\tau_2 < k$ then $$\begin{cases} (Rw)(\tau_1) = w(\mu, \nu) + w(p-\mu, q-\nu) \\ (Rw)(\tau_2) = w(\mu, \nu) - w(p-\mu, q-\nu) \end{cases} \quad (6a)$$

and if $\tau_2 > k$ then $$\begin{cases} (Rw)(\tau_1) = w(\mu, \nu) - w(p-\mu, q-\nu) \\ (Rw)(\tau_2) = w(\mu, \nu) + w(p-\mu, q-\nu) \end{cases} \quad (6b)$$

Given the matrices R and P, $\tilde{S}_{pq}$ is re-written as follows:

$$\begin{aligned} \tilde{S}_{pq} &= R(\tilde{S}_p \otimes \tilde{S}_q)P \\ &= R((E_p^{-1}D_pS_p) \otimes (E_q^{-1}D_qS_q))P \\ &= R[(E_p^{-1}D_p) \otimes (E_q^{-1}D_q)](S_p \otimes S_q)P \end{aligned} \quad (7)$$

and $$R[(E_p^{-1}D_p) \otimes (E_q^{-1}D_q)] = \tilde{D}_{p \otimes q}RT, \quad (8)$$

where $\tilde{D}_{p \otimes q}$ is a pq×pq diagonal matrix whose jj-th term is any of the non-zero entries in the j-th row of $R(E_p^{-1}D_p) \otimes (E_q^{-1}D_q)$. The j-th row of $R(E_p^{-1}D_p) \otimes (E_q^{-1}D_q)$ will have either one or two non-zero entries, and the choice of either of these entries for the diagonal matrix $\tilde{D}_{p \otimes q}$ is proper. T is a pq×pq matrix determined once $\tilde{D}_{p \otimes q}$ is chosen. That is, T is solved for from equation (8) once $\tilde{D}_{p \otimes q}$ and R are known. Let $D_{p \otimes q} = (E_p \otimes E_q)\tilde{D}_{p \otimes q}$ and let $S_{p \otimes q} = S_p \otimes S_q$. Then, since $A_{pq} = E_{p \otimes q} S_{pq}$, $$A_{pq} = D_{p \otimes q} R T S_{p \otimes q} P. \quad (9)$$

This factorization provides efficient processes for multiplying $A_{pq}$ by the data matrix X which is shown by examples below having k=pq=6, 12 corresponding to p=3 and q=2, 4, respectively. The product by $D_{p \otimes q}$ will be absorbed into the dequantization step because it is a diagonal matrix which effectively multiplies the data pointwise by constants as explained below. The product by $D_{p \otimes q}$ is never explicitly calculated because it is absorbed into the dequantization process and so these multiplication steps are eliminated from the inverse transform process. The product by T requires (pq−p−q+1)/2 multiplications. The product by P involves no arithmetic operations because P is a permutation matrix. The product by R requires pq−p−q+1 additions/subtractions. The remainder of the computation will involve the product by $S_{(p \otimes q)}$, which is determined in each case explicitly, and as shown below, is relatively cheap to compute.

Explicit factorizations for the transform matrices $A_6$ and $A_{12}$ are provided below for illustration purposes. The factorizations depend on the choices of quantities for the corresponding $\tilde{D}_{p \otimes q}$ matrices, and as a result the factorizations are not unique. Nevertheless, the other similar factorizations will provide transform multiplications which are similarly efficient to the ones illustrated here. The first step is to factor $A_p = D_p S_p$ for p=2, 3, 4 as these factors will be used as building blocks in determining the factorization of $A_{pq}$.

$$A_2 = \begin{pmatrix} \sqrt{2}/2 & 0 \\ 0 & \sqrt{2}/2 \end{pmatrix} \begin{pmatrix} 1 & 1 \\ 1 & \sqrt{-1} \end{pmatrix}, \quad (10)$$

$$A_3 = \begin{pmatrix} \alpha_1 & 0 & 0 \\ 0 & \alpha_2 & 0 \\ 0 & 0 & \alpha_3 \end{pmatrix} \begin{pmatrix} 1 & 1 & 1 \\ 1 & 0 & -1 \\ 1 & -2 & 1 \end{pmatrix}, \quad (11)$$

where $\alpha_1 = \sqrt{3}/3$, $\alpha_2 = \sqrt{2}/2$, $\alpha_3 = \sqrt{6}/6$.

$$A_4 = D_4 S_4, \quad (12)$$

with $$S_4 = B_3 B_2 B_1 B_0,$$

and $$B_0 = \begin{pmatrix} 1 & 0 & 0 & 1 \\ 0 & 1 & 1 & 0 \\ 1 & 0 & 0 & -1 \\ 0 & 1 & -1 & 0 \end{pmatrix},$$

$$B_1 = \begin{pmatrix} 1 & 1 & 0 & 0 \\ 1 & -1 & 0 & 0 \\ 0 & 0 & 1 & 0 \\ 0 & 0 & 1 & 1 \end{pmatrix},$$

$$B_2 = \begin{pmatrix} 1 & 0 & 0 & 0 \\ 0 & 1 & 0 & 0 \\ 0 & 0 & 1 & 0 \\ 0 & 0 & 0 & \sqrt{2}/2 \end{pmatrix},$$

$$B_3 = \begin{pmatrix} 1 & 0 & 0 & 0 \\ 0 & 0 & 1 & 1 \\ 0 & 1 & 0 & 0 \\ 0 & 0 & 1 & -1 \end{pmatrix},$$

-continued $$D_4 = \begin{pmatrix} 1/2 & 0 & 0 & 0 \\ 0 & \alpha_4 & 0 & 0 \\ 0 & 0 & 1/2 & 0 \\ 0 & 0 & 0 & \alpha_5 \end{pmatrix},$$

where $\alpha_4 = \cos(3\pi/8)$ and $\alpha_5 = \cos(\pi/8)$.
The explicit factorization of $A_6$ is $$A_6 = D_{2 \otimes 3} R_6 T_6 S_{2 \otimes 3} P_6 \tag{13}$$

where $S_{(2 \otimes 3)} = \Phi_1 \Phi_2$, and wherein $$P_6 = \begin{pmatrix} 1 & 0 & 0 & 0 & 0 & 0 \\ 0 & 0 & 0 & 0 & 1 & 0 \\ 0 & 0 & 0 & 0 & 0 & 1 \\ 0 & 0 & 1 & 0 & 0 & 0 \\ 0 & 1 & 0 & 0 & 1 & 0 \\ 0 & 0 & 0 & 1 & 0 & 0 \end{pmatrix},$$

$$\Phi_2 = \begin{pmatrix} 1 & 1 & 1 & 0 & 0 & 0 \\ 1 & 0 & -1 & 0 & 0 & 0 \\ 1 & -2 & 1 & 0 & 0 & 0 \\ 0 & 0 & 0 & 1 & 1 & 1 \\ 0 & 0 & 0 & 1 & 0 & -1 \\ 0 & 0 & 0 & 1 & -2 & 1 \end{pmatrix},$$

$$\Phi_1 = \begin{pmatrix} 1 & 0 & 0 & 1 & 0 & 0 \\ 0 & 1 & 0 & 0 & 1 & 0 \\ 0 & 0 & 1 & 0 & 0 & 1 \\ 1 & 0 & 0 & -1 & 0 & 0 \\ 0 & 1 & 0 & 0 & -1 & 0 \\ 0 & 0 & 1 & 0 & 0 & -1 \end{pmatrix},$$

$$T_6 = \begin{pmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & \sqrt{3} & 0 \\ 0 & 0 & 0 & 0 & 0 & 1 \end{pmatrix},$$

$$R_6 = \begin{pmatrix} 1 & 0 & 0 & 0 & 0 & 0 \\ 0 & 0 & 0 & 0 & 1 & 1 \\ 0 & 1 & 0 & 0 & 0 & 0 \\ 0 & 0 & 0 & 1 & 0 & 0 \\ 0 & 0 & 1 & 0 & 0 & 0 \\ 0 & 0 & 0 & 0 & 1 & -1 \end{pmatrix},$$

$$D_{2 \otimes 3} = \begin{pmatrix} \alpha_2 & 0 & 0 & 0 & 0 & 0 \\ 0 & \alpha_2 & 0 & 0 & 0 & 0 \\ 0 & 0 & 1/2 & 0 & 0 & 0 \\ 0 & 0 & 0 & \alpha_1 & 0 & 0 \\ 0 & 0 & 0 & 0 & \alpha_3 & 0 \\ 0 & 0 & 0 & 0 & 0 & \alpha_2 \end{pmatrix},$$

where $\alpha_1 = \sqrt{6}/6$, $\alpha_2 = \sqrt{6}/12$, and $\alpha_3 = \sqrt{3}/6$.

The product by $D_{2 \otimes 3}$ is not explicitly computed, but rather absorbed into the dequantization process as explained below. Therefore, the 6-point scaled DCT, $S_6$, is of the form $$S_6 = R_6 T_6 \Phi_1 \Phi_2 P_6, \tag{14}$$

and the only non-trivial multiplication arises from the product by $T_6$. Computing the product of a vector by $S_6$ requires, therefore 16 additions/subtractions plus 2 shifts plus 1 multiplication.

The factorization of the transform up to this point has involved the forward DCT process, that is, the transformation of YUV data into DCT form data. The IQDCT is, of course, concerned with the opposite process of transforming DCT form data into YUV form data. However, the inverse transform $S_6^{-1}$ is as easily computed as the transpose of transform $S_6$, because the transform $A_k$ (for every k) is orthogonal so that the inverse is the matrix transform. In particular, $$A_6^{-1} = A_6^t = P_6^t \Phi_2^t \Phi_1^t T_6^t R_6^t D_{2 \otimes 3}, \tag{15a}$$

and its implementation uses the same number of multiplications, additions/subtractions, and shifts as the forward transform. Alternately, an IQDCT on 6 points can be obtained via the direct inversion formula $$A_6^{-1} = P_6^t \Phi_2^{-1} \Phi_1^{-1} T_6^{-1} R_6^{-1} D_{2 \otimes 3}^{-1}. \tag{15b}$$

The entires of each column of the matrix $R_6^{-1}$ are either five 0s and one entry 1, or four 0s, one entry 0.5 and one entry −0.5. The 0.5, −0.5 entries can therefore also be absorbed into the dequantization process.

It should be appreciated that because $\sqrt{3} \cong 1.732$, is also well approximated by $1.75 = 2 - 0.25$, both forward and IQDCTs on 6 points can be well approximated by replacing every multiplication by $\sqrt{3}$ with 2 shifts and a subtraction. In particular, an image which is to be transformed with a 6-point IQDCT may well be transformed with such an approximate IQDCT and the resulting image will be approximately identical to the ideally decoded image. Computing this approximate IQDCT on 6 points requires 17 addition/subtractions and 4 shifts. A similar approximation can be made for the forward scaled-DCT on 6 points. These approximate forward and inverse scaled-DCT transforms can be used in row-column fashion to yield approximate 2-dimensional forward and inverse scaled-DCT transforms each of which which uses no multiplications, 204 additions/subtractions and 48 shifts. This performance is significantly improved over prior art implementations of the transform operation which requires at least 48 multiplications and approximately the same number of additions/subtractions and shifts.

Another explicit example of the factorization process is provided below on 12 points for p=3 and q=4. Specifically, $$A_{12} = D_{3 \otimes 4} R_{12} T_{12} S_{3 \otimes 4} P_{12}, \tag{16}$$

where $$S_{3 \otimes 4} = \Phi_2 K \Phi_1,$$

$$D_{3 \otimes 4} = \text{Diag}(\beta_1, \beta_2, 1/4, \beta_3, \beta_4, \beta_5, \beta_1, \beta_2, \beta_6, \beta_7, 1/4, -\beta_5)$$

with $$\beta_1 = \sqrt{3}/6, \beta_2 = \cos(3\pi/8)/2, \beta_3 = \cos(3\pi/8)/\sqrt{3},$$

-continued $$\beta_4 = \sqrt{2}/4, \beta_5 = \cos(\pi/8)/2$$

$$\beta_6 = \sqrt{6}/12, \beta_7 = \cos(\pi/8)/\sqrt{3},$$

$$R_{12} = \begin{pmatrix} 1 & 0 & 0 & 0 & 0 & 0 & 0 & 0 & 0 & 0 & 0 \\ 0 & 0 & 0 & 0 & 0 & 0 & 1 & 0 & 0 & 0 & 0 & 1 \\ 0 & 0 & 0 & 0 & 0 & 1 & 0 & 0 & 0 & 1 & 0 & 0 \\ 0 & 0 & 1 & 0 & 0 & 0 & 0 & 0 & 0 & 0 & 0 & 0 \\ 0 & 0 & 0 & 0 & 1 & 0 & 0 & 0 & 0 & 0 & 0 & 0 \\ 0 & 0 & 0 & 0 & 0 & 0 & 0 & 1 & 0 & 0 & 1 & 0 \\ 0 & 1 & 0 & 0 & 0 & 0 & 0 & 0 & 0 & 0 & 0 & 0 \\ 0 & 0 & 0 & 0 & 0 & 0 & 1 & 0 & 0 & 0 & 0 & -1 \\ 0 & 0 & 0 & 0 & 0 & 0 & 0 & 1 & 0 & 0 & 0 & 0 \\ 0 & 0 & 0 & 1 & 0 & 0 & 0 & 0 & 0 & 0 & 0 & 0 \\ 0 & 0 & 0 & 0 & 0 & 1 & 0 & 0 & 0 & -1 & 0 & 0 \\ 0 & 0 & 0 & 0 & 0 & 0 & 0 & 1 & 0 & 0 & -1 & 0 \end{pmatrix},$$

$$T_{12} = Diag(1, 1, 1, 1, 1, 1, 1, 1, 1, 2\beta_1, (\beta_3/2\beta_5), (\beta_7/2\beta_2),),$$

$$\Theta_2 = R_3 \otimes R_4,$$

where $$R_3 = \begin{pmatrix} 1 & 1 & 1 \\ 1 & 0 & -1 \\ 1 & -2 & 1 \end{pmatrix},$$

and $$B_5 = \begin{pmatrix} 1 & 0 & 0 & 0 \\ 0 & 1 & 0 & 0 \\ 0 & 0 & 1 & 1 \\ 0 & 0 & 1 & -1 \end{pmatrix},$$

$$\Theta_1 = I_3 \otimes (B_1 B_0),$$

where $I_3$ is the 3×3 identity matrix and the matrices $B_1 B_0$ were described above in the earlier factorization for $A_4$, $$K = Diag(1, 1, 1, \sqrt{2}/2, 1, 1, 1, \sqrt{2}/2, 1, 1, 1, \sqrt{2}/2),$$

and $$P_{12} = \begin{pmatrix} 1 & 0 & 0 & 0 & 0 & 0 & 0 & 0 & 0 & 0 & 0 & 0 \\ 0 & 0 & 0 & 0 & 0 & 0 & 1 & 0 & 0 & 0 & 0 & 0 \\ 0 & 0 & 0 & 0 & 1 & 0 & 0 & 0 & 0 & 0 & 0 & 0 \\ 0 & 0 & 0 & 0 & 0 & 0 & 0 & 0 & 0 & 0 & 0 & 1 \\ 0 & 0 & 0 & 0 & 0 & 0 & 0 & 1 & 0 & 0 & 0 & 0 \\ 0 & 1 & 0 & 0 & 0 & 0 & 0 & 0 & 0 & 0 & 0 & 0 \\ 0 & 0 & 0 & 0 & 0 & 0 & 0 & 0 & 0 & 0 & 1 & 0 \\ 0 & 0 & 0 & 0 & 1 & 0 & 0 & 0 & 0 & 0 & 0 & 0 \\ 0 & 0 & 0 & 0 & 0 & 0 & 0 & 0 & 1 & 0 & 0 & 0 \\ 0 & 0 & 0 & 0 & 0 & 0 & 0 & 0 & 1 & 0 & 0 \\ 0 & 0 & 1 & 0 & 0 & 0 & 0 & 0 & 0 & 0 & 0 & 0 \\ 0 & 0 & 0 & 1 & 0 & 0 & 0 & 0 & 0 & 0 & 0 & 0 \end{pmatrix}.$$

The scaled DCT on 12 points corresponds to the matrix $S_{12} = R_{12} T_{12} S_{3 \otimes 4} P_{12}$. To compute the product by $S_{12}$ via this factorization requires 6 multiplications (3 for $T_{12}$ and 3 for K; the multiplications in the $D_{3 \otimes 4}$ factor are absorbed into the quantization); 49 additions/subtractions (6 for $R_{12}$, 22 for $\Phi_2$ and 21 for $\Phi_1$) and 4 shifts (for $\Phi_2$). Again, as in the 6 point transform, the 12 point transform is orthogonal and so its inverse is its transpose, and the computation of its product requires the same number of multiplications, additions/subtractions, and shifts. Also, the conventional implementations of such a transform require at least 23 multiplications, as compared to 6 multiplications in this embodiment, and approximately the same number of additions/subtractions and shifts.

The above factorization for the IQDCT and dequantization matrix has been developed on the basis of a one dimensional DCT. However, the more important application of the factorization is its application to the 2-dimensional DCT. Fortunately, the above factorization is also applicable to the 2-dimensional DCT applications. The 2-dimensional DCT on k×k points is a linear operator $A_{k \times k}$ whose matrix representation is given as the tensor product $$A_{k \times k} = A_k \otimes A_k. \tag{17}$$

For our case of interest, k=pq with p, q relatively prime, we use the tensor identity $$\begin{aligned} A_{pq} \otimes A_{pq} &= (D_{p \otimes q} RTS_{p \otimes q} P) \otimes (D_{p \otimes q} RTS_{p \otimes q} P) \\ &= (D_{p \otimes q} \otimes D_{p \otimes q})(R \otimes R)(T \otimes T)(S_{p \otimes q} \otimes S_{p \otimes q})(P \otimes P) \end{aligned} \tag{18}$$

More importantly, the $$IQDCT = (R^t \otimes R^t)(T^t \otimes T^t)(S_{p \otimes q}{}^t \otimes S_{p \otimes q}{}^t)(P^t \otimes P^t) \tag{19}$$

The factor $(D_{p \otimes q} \otimes D_{p \otimes q})$ is a diagonal matrix corresponding to thoses non-trivial multiplications which are absorbed into the dequantization matrix. Computation of the product by $(R \otimes R)$ is done in row-column fashion. Computation of the products by $(T \otimes T)$ and $(S_{p \otimes q} \otimes S_{p \otimes q})$ can be done in row-column fashion, but can also be done directly. The direct method depends on the particular parameters p, q, as described by example below. The computation of the product by the permutation matrix $(P \otimes P)$ involves no arithmetic operations.

More specifically, the 2-dimensional scaled DCT on 6×6 points can be handled via the identity $$S_6 \otimes S_6 = (R_6 \otimes R_6)(\Phi_1 \otimes \Phi_1)(\Phi_2 \otimes \Phi_2)(T \otimes T)(R \otimes R).$$

wherein the matrices $P_6, \Phi_1, \Phi_2, T_6, R_6$ are the same as those given in the 1-dimensional 6 point example. The addition steps are done in row-column fashion using 12×16=192 additions/subtractions plus 12×2=24 shifts. The multiplication step may be done either in row-column fashion using 12 multiplications, or in a more efficient way, based on the tensor identity for $(T_6 \otimes T_6)$. This matrix is a diagonal, with diagonal entries all 1 except for 10 entries which are $\sqrt{3}$ and 2 entries which are 3. Hence computing the multiplication stage can be done with 10 multiplications, 2 shifts and 2 additions. Algorithmically, the product by $(T_6 \otimes T_6)$. on a 6×6 input array is obtained as follows: columns 1,2,3,4,6 are multiplied by $T_6$ and column 5 is multiplied by $\sqrt{3}T_6$. The five products by $T_6$ each use 5 multiplications by $\sqrt{3}$, while the product by $\sqrt{3}T_6$ use 5 products by $\sqrt{3}$ and 1 product by 3, the latter which could be done with a shift and an addition. It should be observed that here too the products by $\sqrt{3}$ may be replaced by approximations, as described in the 1-dimensional 6 point example.

The 2-dimensional implementation of the IQDCT on 12×12 points via the row-column method would require 24 times the number of arithmetic operations used in the 1-dimensional DCT example: 144 multiplications, 1176 additions/subtractions and 96 shifts. The two dimensional IQDCT implementation via the direct tensor product formulation reduces the number of multiplications further. All the additions/subtractions sections are done in row-column fashion, so that the count of 1176 would remain the same. The product by $(T_{12} \otimes T_{12})$ can be done with 63 multiplications, and the product by $(K \otimes K)$ can be done with 54 multiplications and 9 shifts. Algorithmically, the product by $(T_{12} \otimes T_{12})$, on a 12×12 input array is obtained as follows: columns 1–9 are each multiplied by $T_{12}$ with 9 multiplications; column 10 is multiplied by $2\beta_1 T_{12}$ with 12 multiplications; column 11 is multiplied by $(\beta_3/2\beta_5)T_{12}$ with 12 multiplications; column 12 is multiplied by $(\beta_7/2\beta_2)T_{12}$ with 12 multiplications. The product by $(K \otimes K)$ on a 12×12 input array is obtained as follows: columns 1,2,3,5,6,7,9,10,11 are each multiplied by K with 3 multiplications; columns 4,8,12 are each multiplied by $(\sqrt{2}/2\ K)$ with 9 multiplications and 3 shifts. Hence the 2-dimensional implementation of an IQDCT on 12×12 points can be done with 117 multiplications (compared with 144 multiplications in the row-column approach using 24 1-dimensional applications to the 12×12 array), 1176 additions/subtractions, and 105 shifts (compared with 96 shifts in the row-column implementation). The trade-off is 27 multiplications for 9 shifts in trading the 1-dimensional row-column method for the direct 2-dimensional DCT implementation.

For the case k=8 the factorization identity for the IQDCT is:

$$C_8 = P_8 D_8 R_{8,1} M_8 R_{8,2},$$

where $C_8$ is the matrix of the 8-point Discrete Cosine Transform, $$P_8 = \begin{pmatrix} 1 & 0 & 0 & 0 & 0 & 0 & 0 & 0 \\ 0 & 0 & 0 & 0 & -1 & 0 & 0 & 0 \\ 0 & 0 & 1 & 0 & 0 & 0 & 0 & 0 \\ 0 & 0 & 0 & 0 & 0 & -1 & 0 & 0 \\ 0 & 1 & 0 & 0 & 0 & 0 & 0 & 0 \\ 0 & 0 & 0 & 0 & 0 & 0 & 0 & -1 \\ 0 & 0 & 0 & 1 & 0 & 0 & 0 & 0 \\ 0 & 0 & 0 & 0 & 0 & 0 & 1 & 0 \end{pmatrix},$$

$D_8$ is the 8×8 diagonal matrix whose diagonal elements are, in sequence from top left to bottom right, ½ times $2\gamma(0)$, $\gamma(4), \gamma(6), \gamma(2), \gamma(5), \gamma(1), \gamma(3), \gamma(7)$ where $\gamma(k)=\cos(2\pi k/32)$, $$R_{8,1} = \begin{pmatrix} 1 & 0 & 0 & 0 & 0 & 0 & 0 & 0 \\ 0 & 1 & 0 & 0 & 0 & 0 & 0 & 0 \\ 0 & 0 & 1 & 1 & 0 & 0 & 0 & 0 \\ 0 & 0 & -1 & 1 & 0 & 0 & 0 & 0 \\ 0 & 0 & 0 & 0 & 1 & 1 & -1 & 0 \\ 0 & 0 & 0 & 0 & -1 & 1 & 0 & 1 \\ 0 & 0 & 0 & 0 & -1 & -1 & -1 & 0 \\ 0 & 0 & 0 & 0 & 1 & -1 & -1 & 1 \end{pmatrix},$$

$$M_8 = \begin{pmatrix} 1 & & & & & & & \\ & 1 & & & & & & \\ & & 1 & & & & & \\ & & & \gamma(4) & & & & \\ & & & & 1 & & & \\ & & & & & \gamma(4) & & \\ & & & & & & \gamma(6) & \gamma(2) \\ & & & & & & -\gamma(2) & \gamma(6) \end{pmatrix},$$

$$R_{8,2} = B_1 B_2 B_3,$$

with $$B_1 = \begin{pmatrix} 1 & 1 & 0 & 0 & 0 & 0 & 0 & 0 \\ -1 & 1 & 0 & 0 & 0 & 0 & 0 & 0 \\ 0 & 0 & 0 & 1 & 0 & 0 & 0 & 0 \\ 0 & 0 & 1 & -1 & 0 & 0 & 0 & 0 \\ 0 & 0 & 0 & 0 & 0 & 0 & -1 & 0 \\ 0 & 0 & 0 & 0 & -1 & 0 & 0 & 1 \\ 0 & 0 & 0 & 0 & 1 & 0 & -1 & 0 \\ 0 & 0 & 0 & 0 & 0 & 1 & 0 & 1 \end{pmatrix}$$

$$B_2 = \begin{pmatrix} 1 & 0 & 0 & 1 & 0 & 0 & 0 & 0 \\ 0 & 1 & 1 & 0 & 0 & 0 & 0 & 0 \\ 1 & 0 & 0 & -1 & 0 & 0 & 0 & 0 \\ 0 & 1 & -1 & 0 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{pmatrix},$$

$$B_3 = \begin{pmatrix} 1 & 0 & 0 & 0 & 0 & 0 & 0 & 1 \\ 0 & 1 & 0 & 0 & 0 & 0 & 1 & 0 \\ 0 & 0 & 1 & 0 & 0 & 1 & 0 & 0 \\ 0 & 0 & 0 & 1 & 1 & 0 & 0 & 0 \\ 1 & 0 & 0 & 0 & 0 & 0 & 0 & -1 \\ 0 & 1 & 0 & 0 & 0 & 0 & -1 & 0 \\ 0 & 0 & 1 & 0 & 0 & -1 & 0 & 0 \\ 0 & 0 & 0 & 1 & -1 & 0 & 0 & 0 \end{pmatrix},$$

and $$C_8 \otimes C_8 (P_8 D_8 R_{8,1} M_8 R_{8,2}) \otimes (P_3 D_8 R_{8,1} M_8 R_{8,2}) =$$

$$((P_8 D_8) \otimes (P_8 D_8))((R_{8,1} M_8 R_{8,2}) \otimes (R_{8,1} M_8 R_{8,2})).$$

The IQDCT, is based on the following matrix identities:

$$C_8^{-1} = R_{8,2}{}^t M_8{}^t R_{8,1}{}^t D_8 P_8{}^t,$$

where the matrices in the above are those defined previously, and $$(C_8 \otimes C_8)^{-1} = ((R_{8,2}{}^t M_8{}^t R_{8,1}{}^t) \otimes (R_{8,2}{}^t M_8{}^t R_{8,1}{}^t))((D_8 P_8{}^t) \otimes (D_8 P_8{}^t))$$

From these identities it can be seen that one can compute the 2-dimensional IQDCT on 8×8 points by first incorporating the product by $$(D_8 P_8{}^t) \otimes (D_8 P_8{}^t)$$

into the dequantization matrix and then computing a product by $$(R_{8,2}{}^t M_8{}^t R_{8,1}{}^t) \otimes (R_{8,2}{}^t M_8{}^t R_{8,1}{}^t).$$

The IQDCT computation can be done following the formula obtained by re-writing $$(R_{8,2}{}^t M_8{}^t R_{8,1}{}^t) \otimes (R_{8,2}{}^t M_8{}^t R_{8,1}{}^t)$$

as $$(R_{8,2}{}^t \otimes R_{8,1}{}^t)(M_8{}^t \otimes M_8{}^t)(R_{8,2}{}^t \otimes R_{8,1}{}^t).$$

The pre and post-additions (products by $$(R_{8,2}{}^t \otimes R_{8,2}{}^t)$$

and $$(R_{8,1}{}^t \otimes R_{8,1}{}^t))$$

are done in row-column fashion with 128 and 288 additions respectively. The core of the 8×8 IQDCT is the computation of the product $$M_8{}^t \otimes M_8{}^t,$$

which will not be done in row-column fashion. Rather, the first, second, third and fifth columns of the 8×8 data matrix will each be multiplied by $$M_8{}^t.$$

Each of these will involve 2 multiplications by γ(4) plus the product by the
$G'_2$,
which can be done with 3 multiplications and 3 additions. The fourth and sixth columns will be multiplied by y(4)M$^t_8$. Each of these can be done with 4 multiplications by y(4), 2 multiplications by 2, plus the product the y(4)G$^t_2$, which can be done with 3 multiplications and 3 additions. The seventh and eighth columns will be handled simultaneously to account for the product by $$G'_2 \otimes M^t_8.$$

A 16-dimensional column vector is formed by interleaving the entries of the seventh and eight columns. The first, second, third and fifth pairs of entries are each multiplied by G$'_2$, while the fourth and sixth pairs are multiplied by y(4) G$'_2$. Each of these takes 3 multiplications and three additions. Finally, the seventh and eighth pairs of entries are multiplied simultaneously by $(G_2 \otimes G_2)'$, with 2 multiplications by y(4), 10 additions and 2 shifts, using an algorithm based on the factorization $$(G_2 \otimes G_2) = \begin{pmatrix} 1 & 0 & 1 & 0 \\ 0 & 1 & 0 & 1 \\ 0 & 1 & 0 & -1 \\ -1 & 0 & 1 & 0 \end{pmatrix} \begin{pmatrix} -\gamma(4)/2 & -\gamma(4)/2 & 0 & 0 \\ \gamma(4)/2 & -\gamma(4)/2 & 0 & 0 \\ 0 & 0 & 1/2 & 0 \\ 0 & 0 & 0 & 1/2 \end{pmatrix} \begin{pmatrix} 1 & 0 & 0 & -1 \\ 0 & 1 & 1 & 0 \\ 1 & 0 & 0 & 1 \\ 0 & 1 & -1 & 0 \end{pmatrix}.$$

Altogether, the entire algorithm for the 2-dimensional IQDCT on 8×8 points calls for 54 multiplications and 462 additions, plus 6 multiplications by ½.

After the dequantization process 330, an IQDCT process 335 and scale process 340 is applied to the resulting data. The combination of the IQDCT and the scale processes forms the final scaled image. The present embodiment will be described for a specific example having a scaling down factor of 3-to-1 in each dimension, provided that the initial image data was encoded with 8×8 DCTs, as is often the case. A generalization of these process steps will then be presented. The scaling proceeds in two stages. First, process 335 produces an image which is scaled down 8-to-3 from the original. This first part of the scaling procedure involves taking only the "top-left" 3×3 block of each 8×8 output block of the IQDCT. Taking the top left 3×3 block of the 8×8 output block requires that the IQDCT output values be multiplied by ⅜. This ⅜ value is absorbed into the dequantization matrix. Explicitly, if the constants associated with the DCT generation for the 3×3 sub-block of the original 8×8 block are $$a_{0,0} \quad a_{1,0} \quad a_{2,0}$$
$$a_{0,1} \quad a_{1,1} \quad a_{2,1}$$
$$a_{0,2} \quad a_{1,2} \quad a_{2,2}$$

then the 3×3 decoded subblock before dequantization (not taking into account the normalization constants for simplicity) is:

$$(1/8)a_{0,0} \quad (3/8\sqrt{6})a_{1,0} \quad (1/8\sqrt{2})a_{2,0}$$
$$(3/8\sqrt{6})a_{0,1} \quad (3/16)a_{1,1} \quad (3/16\sqrt{3})a_{2,1}$$
$$(1/8\sqrt{2})a_{0,2} \quad (1/16\sqrt{3})a_{1,2} \quad (1/16)a_{2,2}$$

The ⅜ factor associated with each constant and the non-trivial multiplications are absorbed into the dequantization matrix. The resulting scaled block will be called B. Block B is then subjected to an IQDCT process which involves the row-column implementation of the product by the matrix C given as $$\begin{matrix} 1 & 1 & 1 \\ 1 & 0 & -2 \\ 1 & -1 & 1 \end{matrix}$$

That is, each of the three columns is multiplied by the matrix C and then each of the resulting 3 rows are multiplied by the matrix C. Another way of viewing this, is that a matrix A is computed via the formula $$A = CBC^t$$

The resulting image, formed by the contiguous concatenation of these resulting 3×3 blocks A is a scaled down version of the original images, with scaling factor ⅜th in each of the two dimensions. Such scaling can be said to have been done in the frequency domain.

The second part of the scaling process 340, is to scale down ⅞th in each dimension. That is the ⅜×⅞ is ⅓. This is accomplished in the spatial domain. It is essentially done by a low-pass filter followed by decimation, in row-column fashion. Hence the second scaling can be completely described by its action on a vector input. Let the vector be labeled as a sequence of 9-tuples $$x_{j,0}, x_{j,1}, x_{j,2}, \ldots, x_{j,8}$$

with $1 \leq j \leq J$, and define $$x_{0,8} = x_{1,0} \quad x_{0,7} = x_{0,8}.$$

Presented below are three methods for the scaling. The first uses short filters and short coefficients and is computationally simplest to implement, but will not give the best quality scaling; it will provide, however, adequate imaging for quality for many applications. The second uses long filters and short coefficients and is computationally somewhat more expensive; it will give somewhat enhanced quality images. The third uses long filters and long coefficients, is computationally even more expensive and will give even better quality results.

1. Short Filters, Short Coefficients:
   For every j compute:

$$y_{j,0} = (1/16)x_{j-1,8} + (14/16)x_{j,0} + (1/16)x_{j,1}$$
$$y_{j,1} = (13/16)x_{j,1} + (3/16)x_{j,2}$$
$$y_{j,2} = (11/16)x_{j,2} + (5/16)x_{j,3}$$
$$y_{j,3} = (10/16)x_{j,3} + (6/16)x_{j,4}$$
$$y_{j,4} = (8/16)x_{j,4} + (8/16)x_{j,5}$$
$$y_{j,5} = (6/16)x_{j,5} + (10/16)x_{j,6}$$
$$y_{j,6} = (5/16)x_{j,6} + (11/16)x_{j,7}$$
$$y_{j,7} = (3/16)x_{j,7} + (13/16)x_{j,8}$$

2. Long Filters, Short Coefficients:
   For every j compute:

$$y_{j,0} = (-1/16)x_{j-1,7} + (2/16)x_{j-1,8} + (14/16)x_{j,0} + (2/16)x_{j,1} + (11/16)x_{j,2}$$
$$y_{j,1} = (15/16)x_{j,1} + (4/16)x_{j,2} + (-3/16)x_{j,3}$$
$$y_{j,2} = (-1/16)x_{j,1} + (14/16)x_{j,2} + (6/16)x_{j,3} + (-3/16)x_{j,4}$$
$$y_{j,3} = (-2/16)x_{j,2} + (12/16)x_{j,3} + (9/16)x_{j,4} + (-3/16)x_{j,5}$$
$$y_{j,4} = (-4/16)x_{j,3} + (12/16)x_{j,4} + (12/16)x_{j,5} + (-4/16)x_{j,6}$$
$$y_{j,5} = (-3/16)x_{j,3} + (9/16)x_{j,4} + (12/16)x_{j,5} + (-2/16)x_{j,6}$$
$$y_{j,6} = (-3/16)x_{j,4} + (6/16)x_{j,5} + (14/16)x_{j,6} + (-1/16)x_{j,7}$$
$$y_{j,7} = (-2/16)x_{j,5} + (4/16)x_{j,6} + (15/16)x_{j,7}$$

3. Long Filters, Long Coefficients:
   For every j compute:

$$y_{j,0} = (0.120694)x_{j-1,8} + (0.985443)x_{j,0} + (0.12064)x_{j,1} - (0.113415)(x_{j,2} + x_{j-1,7})$$
$$y_{j,1} = (0.909357)x_{j,1} + (0.244148)x_{j,2} + (-0.153505)x_{j,3}$$
$$y_{j,2} = (-0.094694)x_{j,1} + (0.889829)x_{j,2} + (0.399621)x_{j,3} + (-0.194757)x_{j,4}$$
$$y_{j,3} = (-0.166270)x_{j,2} + (0.821390)x_{j,3} + (0.560430)x_{j,4} + (-0.215550)x_{j,5}$$
$$y_{j,4} = (-0.207342)x_{j,3} + (0.707342)x_{j,4} + (0.707342)x_{j,5} + (-0.207342)x_{j,6}$$
$$y_{j,5} = (-0.215550)x_{j,4} + (0.560430)x_{j,5} + (0.821390)x_{j,6} + (-0.166270)x_{j,7}$$
$$y_{j,6} = (-0.194757)x_{j,5} + (0.399621)x_{j,6} + (0.889829)x_{j,7} + (-0.094694)x_{j,8}$$
$$y_{j,7} = (-0.153505)x_{j,6} + (0.244248)x_{j,7} + (0.9093574)x_{j,8}$$

The resulting image is a 3 to 1 scaling of the original image. The complexity of this two part task is as follows. The descaling involves pointwise multiplication by preassigned constants on each of the non-zero values of each of the 3×3 blocks at the beginning of the process. This involves a cost of at most 9 multiplication per original 8×8 block of the unscaled image, or at most 0.140625 multiplications per pixel in the original image. The inverse scaled-DCT involves 24 additions and 6 shifts (multiplications by 2) per 3×3 block of the scaled down image, or equivalently 0.375 additions and 0.09375 shifts per pixel in the original image. The low-pass filtering and subsampling involves 54 multiplications and 46 additions on each 9×9 block of the scaled-down image, and hence 0.09375 multiplications and 0.07986 additions per pixel in the original image. The total cost is less than 0.24 multiplications, 0.46 additions, and 0.094 shifts per pixel in the original image. Clearly, the multiplications involved in the short filters can all be done with few shifts and adds. Also, since only 16 coefficients are used for multiplications (in the filters with long coefficients; only 9 are used in the filters with the short coefficients) these can be replaced by table look-ups without a significant demand on memory.

More generally, if the data is stored as DCT values of blocks of size P×Q and an output image is to be scaled by a factor of R in one dimension and S in the second dimension, then the process is performed in two stages. First a scaling of factor K1/P in the first dimension and a scaling of factor L1/Q in the second dimension are done by inverse transforming with 2-dimensional DCTs of size K1×L1. The non-trivial multiplication factors in the IQDCT and the factor $\sqrt{(R/P)} \times \sqrt{(S/Q)}$ are absorbed into the dequantization matrix. After the IQDCT process, a second factor of K2/K3 in the first dimension and a scaling of factor L2/L3 in the second dimension is performed in the spatial domain. The integers K1, K2, K3, L1, L2, L3 are chosen so that (K1K2/K3)=R, (L1L2/L3)=S, (K1/P)$\geq$R, (L1/Q)$\geq$S, and the ratios (K2/K3) and (L1/L2) are close to 1. More specifically, the ratios (K2/K3) and (L1/L2) are within the range of 0.5 to 1.5. The inequality constraints guarantees that the inverse DCT process does not remove low-frequency components that should be present in in image scaled down by factors R,S. The conditions that the ratios K2/K3 and L2/L3 be close to 1 are imposed so that the scaling procedure be simple and fast to implement.

Typically, but not necessarily, P=Q, R=S, K1=L1, K2=L2, K3=L3. For example, for P=Q=8 one may take K2=L2=8 and achieve scalings by factor R=S using the following parameters (with K1=L1 and K3=L3):

|    | 1/3 | 2/3 | 1/5 | 2/5 | 3/5 | 4/5 | 1/6 |
|----|-----|-----|-----|-----|-----|-----|-----|
| K1 | 3   | 6   | 2   | 4   | 6   | 8   | 2   |
| K3 | 9   | 9   | 10  | 10  | 10  | 10  | 12  |

The output of the second part of the scaling process 340 is Y"U"V" data and this data is sent to transform means 350 for conversion to R"G"B" data. Specifically, the transform means 350 converts Y"U"V" data to R"G"B" data according to the following function: R"=Y"−V" and G"=Y"+0.194 G"+0.509 B" and B"=Y"−U". After the R"G"B" data has been generated it can then be displayed on a conventional color display 400, or any type of display for RGB form data.

Figure 4:
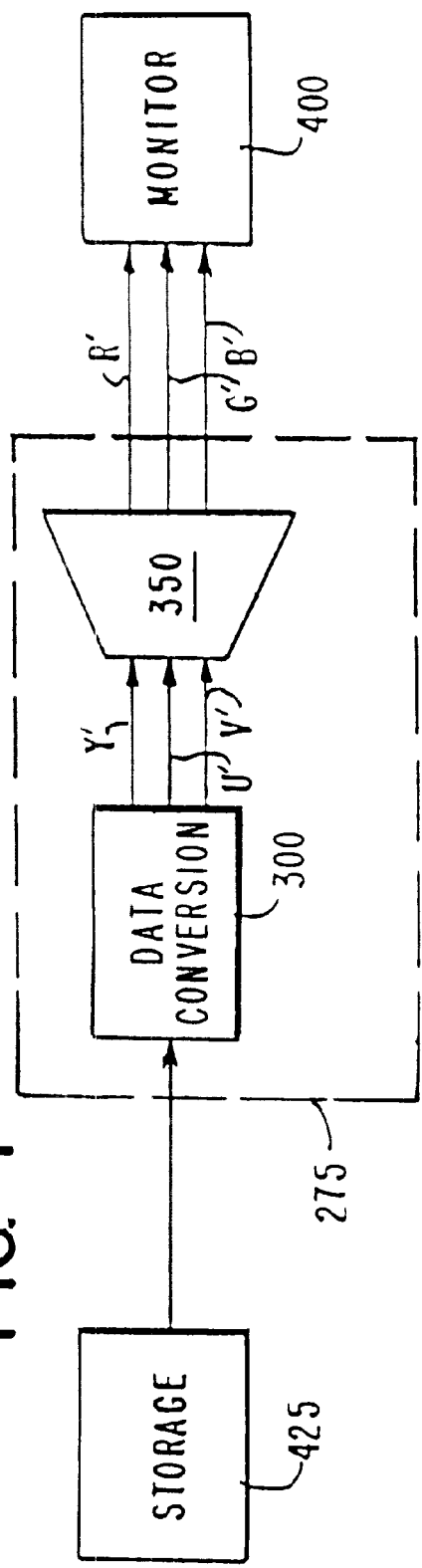
FIG. 4 illustrates an alternate embodiment of a digital image processing system according to the present invention.
Figure 5:
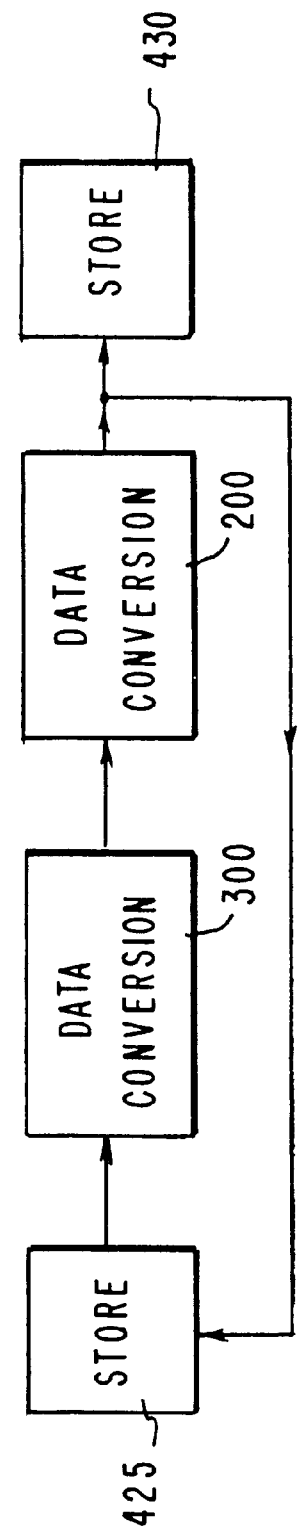
FIG. 5 illustrates an embodiment of a storage system according to the present invention.

FIG. 4 illustrates an alternate embodiment of the present invention in which the coded DCT data is stored in storage means 425. Storage means 425 is a conventional disk or tape data storage medium. Storage means 425 can also be any storage medium suitable for digital storage of data whether electronic, optical, or magnetic. The stored data can then be retrieved and processed in the same manner as indicated above, that is, sent to processor 275 and displayed on monitor 400. FIG. 5 illustrates still another alternate embodiment of the present invention. FIG. 5 illustrates a storage system in which stored image data representing an image of a first size is converted into image data representing the same image scaled to a second size. In particular, storage means 425 contains stored image data and is coupled to data conversion means 300 which incorporates the decoding means 325, dequantization means 330, inverse DCT means 335, and scaling means 340 explained above. Data conversion means 300 is coupled to data conversion means 200 which incorporates DCT means 230, quantization means 235, and encode means 240 as explained above. Data conversion means 300 transmits scaled image data to data conversion means 200 which transmits coded scaled image data to either storage means 425 or other storage means 430. The storage system illustrated in FIG. 5 facilitates rapid conversion of image data into a format compatible for many different display systems which may be connected to the storage system.

While the invention has been described and illustrated with respect to plural embodiments thereof, it will be understood by those skilled in the art that various changes in the detail may be made therein without departing from the spirit, scope, and teaching of the invention. Therefore, the invention disclosed herein is to be limited only as specified in the following claims.

We claim:

1. A method comprising:

providing a source of light from an image subject; said source of light comprising red, blue and green light;

selecting said red light, said blue light and said green light from said source of light;

directing said red light, said blue light, and said green light to a red light sensor, a blue light sensor and a green light sensor respectively;

sensing said selected red light as sensed red light and transforming said sensed red light into a red two-dimensional matrix;

sensing said selected green light as sensed green light and transferring said sensed green light into a green two-dimensional matrix;

sensing said selected blue light as sensed blue light and transforming said sensed blue light into a blue two-dimensional matrix;

each of said red, blue and green two-dimensional matrices are separately treated as a first two-dimensional matrix which are processed by a method for scaling an image contained within said first two-dimensional matrix, which corresponds to a first area into an image contained within a second two-dimensional area, wherein the ratio of said first and second areas is (R/P)-to-1 in a first dimension and (S/Q)-to-1 in a second dimension, comprising:

receiving DCT block data representing said image contained within said first area, said data being subdivided into a plurality of subblocks of transform data, each of said subblocks having P×Q points;

subdividing each of said subblocks having P×Q points into subdivided subblocks having K1×K2 points;

multiplying said K1×K2 data within each of said subdivided subblocks by $\sqrt{(K1/P)} \times \sqrt{(L1/Q)}$;

applying an inverse DCT transform of size K1×K2 to said subdivided subblocks; and scaling said subdivided subblocks to a ratio of (K1K2/K3)=R and (L1L2/L3)=S.

2. A method for scaling an image, as in claim 1, further comprising dequantizing said received DCT block data representing said image; and absorbing said multiplication by $\sqrt{(K1/P)} \times \sqrt{(L1/Q)}$ into said dequantization step.

3. A method for scaling an image, as in claim 2, wherein:

multiplication by approximately $\sqrt{3}$ is performed solely by shift and add steps.

4. A method for scaling an image, as in claim 3, wherein: (K1/P)≧R, (L1/Q)≧S, (K2/K3) is approximately equal to 1, and (L2/L3) is approximately equal to 1.

5. A method for scaling an image, as in claim 4, wherein: P=Q and R=S.

6. A method comprising:

providing a source of light from an image subject; said source of light comprising red, blue and green light;

selecting said red light, said blue light and said green light from said source of light;

directing said red light, said blue light and said green light to a red light sensor, a blue light sensor and a green light sensor respectively;

sensing said selected red light as sensed red light and transforming said sensed red light into a red two-dimensional matrix;

sensing said selected green light as sensed green light and transferring said sensed green light into a green two-dimensional matrix;

each of said red, blue and green two-dimensional arrays are separately treated as a first two-dimensional matrix which are processed by method for displaying an image contained within said first two-dimensional matrix, which corresponds to a first area, onto a display within a second two-dimensional area of said display wherein the ratio of said first to second areas is (R/P)-to-1 in a first dimension and (S/Q)-to-1 in a second dimension, comprising:

receiving DCT block data representing said image contained within said first area, said data being subdivided into a plurality of subblocks of transform data, each of said subblocks having P×Q points;

subdividing each of said subblocks having P×Q points into subdivided subblocks having K1×K2 points;

multiplying said K1×K2 data within each of said subdivided subblocks by $\sqrt{(K1/P)} \times \sqrt{(L1/Q)}$;

applying an inverse DCT transform of size K1×K2 to said subdivided subblocks;

scaling said subdivided subblocks to a ratio of (K2/K3)-to-1 in said first dimension and a ratio of (L2/L3)-to-1 in said second dimension, wherein (K1K2/K3)=R and (L1L2/L3)=S;

converting said scaled data into RGB form data;

transmitting said RGB form data to said display; and converting said RGB data into signals compatible with said display; and applying said signals to said display to form said image on said display.

7. A method for scaling an image, as in claim 6, further comprising:

dequantizing said received DCT block data representing said image; and absorbing said multiplication by $\sqrt{(K1/P)} \times \sqrt{(L1/Q)}$ into said dequantization step.

8. A method for scaling an image, as in claim 7, wherein: multiplication by approximately $\sqrt{3}$ is performed solely by shift and add steps.

9. A method for scaling an image, as in claim 8, wherein: $(K1/P) \geq R$, $(L1/Q) \geq S$, $(K2/K3)$ is approximately equal to 1, and $(L2/L3)$ is approximately equal to 1.

10. A method for scaling an image, as in claim 9, wherein: $P=Q$ and $R=S$.

11. A method comprising:

providing a source of light from an image subject; said source of light comprising red, blue and green light;

selecting said red light, said blue light and said green light from said source of light;

directing said red light, said blue light and said green light to a red light sensor, a blue light sensor and a green light sensor respectively;

sensing said selected red light as sensed red light and transforming said sensed red light into a red two-dimensional matrix;

sensing said selected blue light as sensed blue light and transforming said sensed blue light into a blue two-dimensional matrix;

sensing said selected green light as sensed green light and transforming said sensed green light into a green two-dimensional matrix;

each of said red, blue and green two-dimensional matrices are separately treated as first two-dimensional matrix which are processed by a method for storing an image, comprising:

receiving DCT block data representing said image contained within said first two-dimensional matrix area, said data being subdivided into a plurality of subblocks of transform data, each of said subblocks having P×Q points;

subdividing each of said subblocks having P×Q points into subdivided subblocks having K1×K2 points;

multiplying said K1×K2 data within each of said subblocks by $\sqrt{(K1/P)} \times \sqrt{(L1/Q)}$;

coding said DCT transform data;

converting said coded data into signals compatible with a storage means; and applying said signals to said storage means for storing said signals.

12. A method for storing an image, as in claim 11, further comprising:

dequantizing said received DCT block data representing said image; and absorbing said multiplication by $\sqrt{(K1/P)} \times \sqrt{(L1/Q)}$ into said dequantization step.

13. A method for storing an image, as in claim 12, wherein:

multiplication by approximately $\sqrt{3}$ is performed solely by shift and add steps.

14. A method for storing an image, as in claim 13, wherein:

$(K1K2)/K3=R, (L1L2)/L3=S, (K1/P) \geq R$, $(L1/Q) \geq S$, $(K2/K3)$ is approximately equal to 1, and $(L2/L3)$ is approximately equal to 1.

15. A method for storing an image, as in claim 14, wherein:

$P=Q$ and $R=S$.

16. An apparatus comprising:

a means for providing a source of light from an image subject; said source of light comprising red, blue and green light;

a means for selecting said red light, said blue light and said green light from said source of light;

a means for directing said red light, said blue light and said green light to a red light sensor, a blue light sensor and a green light sensor respectively;

a means for sensing said selected red light as sensed red light and transforming said sensed red light into a red two-dimensional matrix;

a means for sensing said selected blue light as sensed blue light and transforming said sensed blue light into a blue two-dimensional matrix;

a means for sensing said selected green light as sensed green light and transforming said sensed green light into a green two-dimensional matrix;

each of said red, blue and green two-dimensional matrices are separately treated as a first two-dimensional matrix which are processed by an image processor for scaling an image contained within a first two-dimensional area into an image contained within a second two-dimensional area, wherein the ratio of said first to second areas is (R/P)-to-1 in a first dimension and (S/Q)-to-1 in a second dimension, comprising:

a receiver for receiving pixel data representing said image contained within a non-scaled area, said pixel data being subdivided into a plurality of subblocks of pixel data, each of said subblocks having P×Q pixels;

a subdivision means for subdividing each of said subblocks into subdivided subblocks, each of said subdivided subblocks having R×S pixels;

a multiplier for multiplying said pixel data within each of said subdivided subblocks by $\sqrt{(K1/P)} \times \sqrt{(L1/Q)}$;

an inverse DCT transform means for converting said subdivided subblocks into YUV form data; and a scaling means for scaling said YUV form data in the spatial domain.

17. A image processor, as in claim 16, further comprising:

a dequantization means for dequantizing said received pixel data representing said image wherein aid dequantization means absorbs said multiplication by $\sqrt{(K1/P)} \times \sqrt{(L1/Q)}$.

18. An image processor, as in claim 17, wherein:

multiplication by approximately $\sqrt{3}$ is performed solely by shift and add steps.

19. An image processor, as in claim 18, wherein:

$(K1K2)/K3=R, (L1L2)/L3=S, (K1/P) \geq R, (L1/Q) \geq S$, $(K2/K3)$ is approximately equal to 1, and $(L2/L3)$ is approximately equal to 1.

20. An image processor, as in claim 19, wherein:

$P=Q$ and $R=S$.

21. An apparatus comprising:

a means for providing a source of light from an image subject; said source of light comprising red, blue and green light;

a means for selecting said red light, said blue light and said green light from said source of light;

a means for directing said red light, said blue light and said green light to a red light sensor, a blue light sensor and a green light sensor respectively;

a means for sensing said selected red light as sensed red light and transforming said sensed red light into a red two-dimensional matrix;

a means for sensing said selected blue light as sensed blue light and transforming said sensed blue light into a blue two-dimensional matrix;

a means for sensing said selected green light as sensed green light and transforming said sensed green light into a green two-dimensional matrix;

each of said red, blue and green two-dimensional matrices are separately treated as a first two-dimensional matrix which are processed by a means for displaying an image contained within said first two-dimensional matrix which corresponds to a first area onto a second two-dimensional area of a display, wherein the ratio of said first to second areas is (R/P)-to-1 in a first dimension and (S/Q)-to-1 in a second dimension, comprising:

a received for receiving pixel data representing said image contained within said first area, said pixel data being subdivided into a plurality of subblocks of pixel data, each of said subblocks having P×Q pixels;

a means for subdividing each of said subblocks having P×Q points into subdivided subblocks by $\sqrt{(K1/P)} \times \sqrt{(L1/Q)}$;

a multiplier for multiplying said pixel data within each of said subdivided subblocks by $\sqrt{(K1/P)} \times \sqrt{(L1/Q)}$;

an inverse DCT transform means for converting said subdivided subblocks into YUV form data;

a scaling means for scaling said YUV form data in the spatial domain;

a RGB transform means for converting said scaled data into RGB form data;

a transmitter for transmitting said RGB form data to said display; and a conversion means for converting said RGB data into signals compatible with said display and applying said signals to said display to form said image on said display.

22. A display system, as in claim 21, further comprising:

a dequantization means for dequantizing said received pixel data representing said image wherein said dequantization means absorbs said multiplication by $\sqrt{(K1/P)} \times \sqrt{(L1/Q)}$.

23. A display system, as in claim 22, wherein:

multiplication by approximately $\sqrt{3}$ is performed solely by shift and add steps.

24. A display system, as in claim 23, wherein:

(K1K2)/K3=R,(L1L2)/L3=S,(K1/P)≧R,(L1/Q)≧S, (K2/K3) is approximately equal to 1, and (L2/L3) is approximately equal to 1.

25. A display system, as in claim 24, wherein:

P=Q and R=S.

26. A method comprising:

providing a source of light from an image subject; said source of light comprising red, blue and green light;

selecting said red light, said blue light and said green light from said source of light;

directing said red light, said blue light and said green light to a red light sensor, a blue light sensor and a green light sensor respectively;

sensing said selected red light as sensed red light and transforming said sensed red light into a red two-dimensional matrix;

sensing said selected blue light as sensed blue light and transforming said sensed blue light into a blue two-dimensional matrix;

sensing said selected green light as sensed green light and transforming said sensed green light into a green two-dimensional matrix;

each of said red, blue and green two-dimensional matrices are separately treated as a first two-dimensional matrix which are processed by a storage system, comprising:

a storage means for storing signals;

a receiver for receiving pixel data representing said image, said image being contained within said first two-dimensional matrix, which corresponds to a first area said pixel data being subdivided into a plurality of subblocks of pixel data, each of said subblocks having P×Q pixels;

a means for subdividing each of said subblocks having P×Q points into subdivided subblocks having K1×K2 points;

a multiplier for multiplying said pixel data within each of said subdivided subblocks by $\sqrt{(K1/P)} \times \sqrt{(L1/Q)}$;

an inverse transform means for applying an inverse DCT transform to said subdivided subblocks;

a scale means for scaling said subdivided subblocks in the spatial domain, said scaled data representing an image contained within a second two-dimensional area, wherein the ratio for said first and second areas is (K2/K3)-to-1 in a first dimension and a ratio of L2/L3)-to-1 in a second dimension, where (K1K2/K3)=R and (L1L2/L3)=S;

a transform means for applying a DCT transform to said scaled data;

a conversion means for converting said coded data into signals compatible with said storage means and applying said signals to said storage means for storing said signals.

27. A storage system for storing an image, as in claim 26, further comprising:

a dequantization means for dequantizing said received pixel data representing said image and absorbing said multiplication by $\sqrt{(K1/P)} \times \sqrt{(L1/Q)}$ into said dequantization step.

28. A storage system for storing an image, as in claim 27, wherein:

multiplication by approximately $\sqrt{3}$ is performed solely by shift and add steps.

29. A storage system for storing an image, as in claim 28, wherein:

(K1/P)≧R, (L1/Q)≧S, (K2/K3) is approximately equal to 1, and (L2/L3) is approximately equal to 1.

30. A storage system for storing an image, as in claim 29, wherein:

P=Q and R=S.

* * * * *